United States Patent [19]

Katz et al.

[11] B 4,053,067
[45] Oct. 11, 1977

[54] FUEL TRANSFER SYSTEM FOR A NUCLEAR REACTOR

[75] Inventors: Leonard R. Katz; James R. Marshall, both of Pittsburgh; Walter E. Desmarchais, Monroeville, all of Pa.

[73] Assignee: Westinghouse Electric Corporation, Pittsburgh, Pa.

[21] Appl. No.: 373,344

[22] Filed: June 25, 1973

[44] Published under first Trial Voluntary Protest Program on Feb. 3, 1976

[51] Int. Cl.² ............................................. F23K 3/00
[52] U.S. Cl. .................................. 214/18 N; 176/30; 200/52 R
[58] Field of Search ................. 214/18 N; 176/30, 31; 200/61.41, 52 A, 52 R; 116/124 F, 124 L, 124 B; 214/38 B, 38 BB

[56] References Cited
U.S. PATENT DOCUMENTS

| 2,575,650 | 11/1951 | Alexander | 200/52 |
|---|---|---|---|
| 3,020,225 | 2/1962 | Wootton | 176/30 |
| 3,194,742 | 7/1965 | Aubert et al. | 176/30 |
| 3,260,384 | 7/1966 | Lemesle et al. | 214/18 N |
| 3,637,096 | 2/1969 | Crates | 214/18 N |
| 3,756,914 | 9/1973 | Whittaker | 214/18 N |
| 3,765,549 | 10/1973 | Jones | 176/30 |

*Primary Examiner*—Robert G. Sheridan
*Assistant Examiner*—Gary Auton
*Attorney, Agent, or Firm*—J. R. Campbell; Z. L. Dermer

[57] ABSTRACT

A fuel transfer system for moving nuclear reactor fuel assemblies from a new fuel storage pit to a containment area containing the nuclear reactor, and for transferring spent fuel assemblies under water from the reactor to a spent fuel storage area. The system includes an underwater track which extends through a wall dividing the fuel building from the reactor containment and a car on the track serves as the vehicle for moving fuel assemblies between these two areas. The car is driven by a motor and linkage extending from an operating deck to a chain belt drive on the car. A housing pivotally mounted at its center on the car is hydraulically actuated to vertically receive a fuel assembly which then is rotated to a horizontal position to permit movement through the wall between the containment and fuel building areas. Return to the vertical position provides for fuel assembly removal and the reverse process is repeated when transferring an assembly in the opposite direction. Limit switches used in controlling operation of the system are designed to be replaced from the operating deck when necessary by tools designed for this purpose.

5 Claims, 8 Drawing Figures

FUEL TRANSFER SYSTEM FOR A NUCLEAR REACTOR

BACKGROUND OF THE INVENTION

The invention described herein relates to nuclear reactors and more particularly to a system for transferring fuel assemblies between a fuel handling building and the containment area which encloses the reactor.

The fuel for large nuclear reactors of the type used for generating electrical power, is contained in long, small diameter fuel rods or elements ranging in length from 12 to about 20 feet. Typically, about 225–400 fuel elements are disposed in a predetermined pattern in a fuel assembly with spaces provided between the fuel elements for vertically adjustable control rods. Although the number of fuel assemblies may vary from reactor to reactor, a perspective on reactor size may be appreciated from the fact that a 1100 megawatt reactor will contain 200 fuel assemblies. When these fuel assemblies are set in position and the reactor placed in operation, the fission process generates heat and in so doing consumes the fuel thus requiring removal and replacement of old fuel assemblies with new assemblies containing fresh fuel. Since the metallic rods and other supporting structures in each assembly becomes radioactive, the operation which effects transfer of old for new assemblies must be carried out completely underwater. As with usual reactor constructions, the reactor head and associated components are removed and the reactor containment flooded to a level sufficient to permit keeping the assembly submerged as the assembly is lifted vertically from the reactor core and transferred to a shipping container.

According to past practices, each fuel assembly is removed from the reactor to a transfer area wherein the assembly is pivoted at one end and lowered for movement horizontally through a canal to a spent fuel pit. To protect against damage to fuel elements and release of radioactive gases in the event of cable breakage or other accident, an elaborate shock absorber arrangement is used to decelerate the container as it falls. The lifting and shock absorber structure needed for this purpose occupies the working area space and obstructs the movement of equipment used in the transfer process. Also, each assembly is moved to the spent fuel area by a transfer car powered by an underwater air motor, sprocket and chain arrangement connected to the car and the housing. Should the sprocket and chain break or the motor become inoperative, the canal thereafter must be drained of radioactive water to effect repair to the equipment.

Underwater limit switches also used for signaling, controlling and interlocking various operations in the system may become inoperable, and as bypass switches are then used to carry out the transfer operation, the protection afforded by the limit switches is lost and the possibility then exists the fuel elements inadvertently could be damaged because of lack of adequate protective systems.

The above discussion illustrates that the disadvantages inherent in prior systems suggests the need exists for an improved fuel transfer system which will be less costly but more efficient to provide the reliability needed for nuclear reactor operations.

SUMMARY OF THE INVENTION

Briefly stated, the above disadvantages are eliminated by providing a fuel assembly transfer arrangement which utilizes hydraulically actuated components capable of safely handling and controlling fuel assembly movement even under loss of power conditions. The electrical and other equipment used in the control process which might fail is located above the water level where repairs can promptly and efficiently be made. To preclude the necessity of draining the system for repairs to power moving, interlocking and other devices, the parts are arranged such that replacement from the operating deck may be made by tools especially designed for this purpose.

An object of the invention therefore is to provide a fuel handling system in which the control and other power operated components subject to failure are located in an accessible area for replacement or repairs.

Another object of the invention is the provision of an improved arrangement for holding a container having a fuel assembly therein to minimize the likelihood of damage to fuel elements in the assembly while it is being transported from one location to another.

Still another object of the invention is the provision of an improved arrangement for replacing electrical interlocking devices and switches submerged in radioactive water.

BRIEF DESCRIPTION OF THE DRAWINGS

The subject matter which we regard as our invention is particularly pointed out and distinctly claimed in the concluding portion of this specification. Our invention however, both as to organization and method of operation, together with further objects and advantages thereof, may best be understood by reference to the following description taken in connection with the accompanying drawing in which:

DESCRIPTION OF THE PREFERRED EMBODIMENTS

Figure 1:
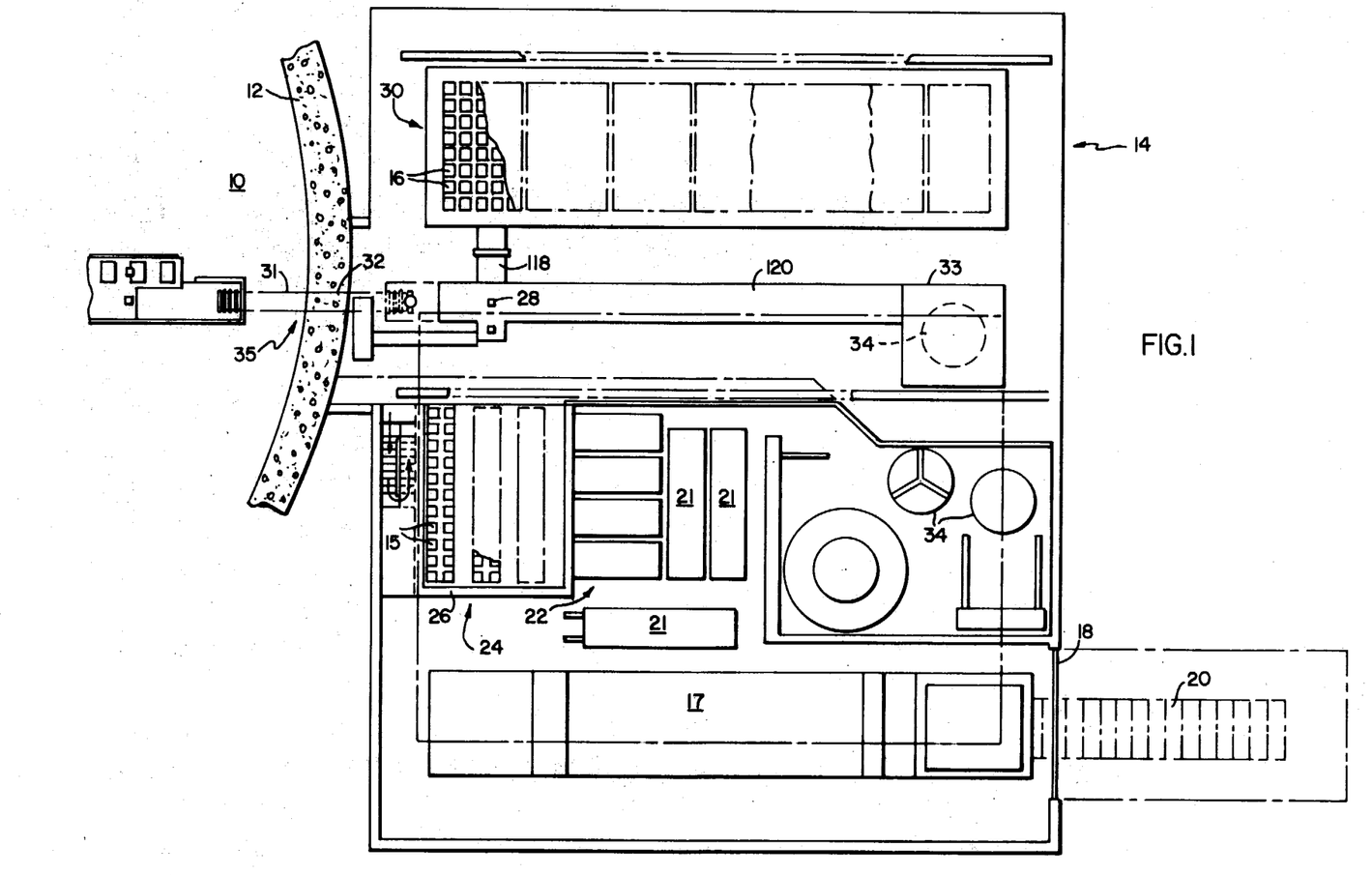
FIG. 1 is a plan view of new and spent fuel storage areas and the transfer system used to move fuel assemblies between the storage areas and a nuclear reactor.

Referring now to the drawings wherein like reference characters designate like or corresponding parts throughout the several views, there is shown in FIG. 1 a plan view of a fuel handling building generally showing the location of the reactor containment, fuel areas and fuel handling facilities. The containment area 10 houses the nuclear reactor and associated equipment (not shown) all of which are enclosed in a thick walled upstanding concrete cylinder 12. The fuel handling building 14 contains storage facilities for both new fuel assemblies 15 to be loaded into the reactor and spent fuel assemblies 16 which have been removed and are awaiting shipment to a disposal area.

Considering the new fuel assembly storage facilities and transfer system first, both new fuel assemblies and spent fuel assemblies are shipped to and from the reactor site in a railroad car 17. The fuel handling building 14 is equipped with a roll up door 18 which permits railroad car movement into the building on tracks 20. Usually two fuel assemblies of the type disclosed above are shipped in one container 21 and each container is removed to an upending and unloading area 22 where the fuel assemblies are removed by an overhead crane (not shown) and placed in a new fuel storage area 24 enclosed by walls 26 until ready for use. While in this location, the fuel assemblies 15 are exposed to air circulating throughout the building since the fuel is in a dormant state and does not emit harmful rays of radioactive energy. Also, depending on the loaded condition of storage area 24, the containers 21 housing the fuel assemblies may be stored temporarily alongside the new fuel storage area, as shown. When it is desired to move the new fuel assemblies from the storage area 24 into the reactor containment area 10, the overhead crane separately lifts each fuel assembly from its storage space and moves in a horizontal direction to a fuel elevator 28 where it is lowered to the bottom of the elevator for transfer by the fuel transfer system disclosed herein into the reactor containment area 10.

Figure 2A:
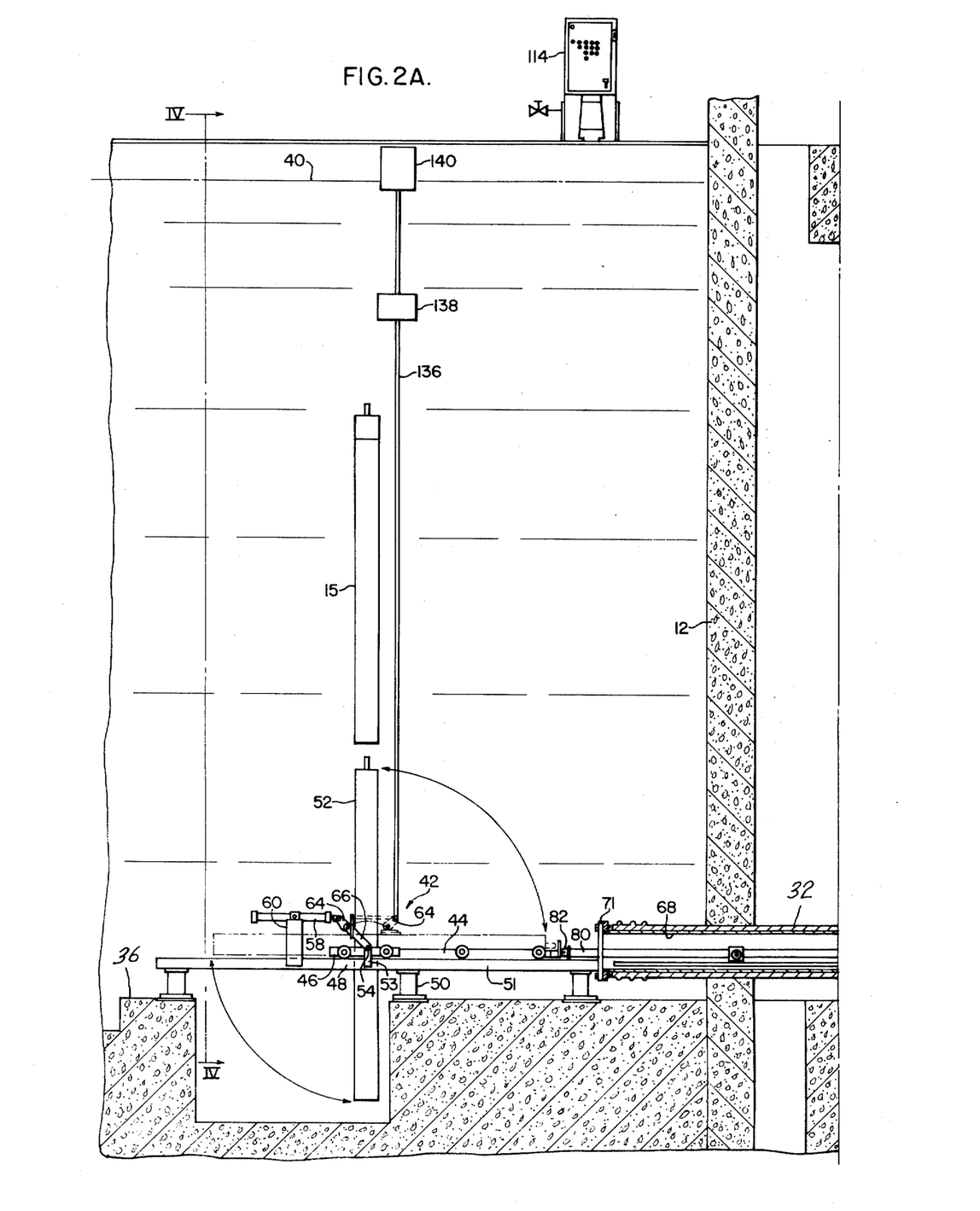
FIGS. 2A, 2B and 2C are views in elevation, partly in section, illustrating the relative disposition of components comprising a fuel transfer system.
Figure 2B:
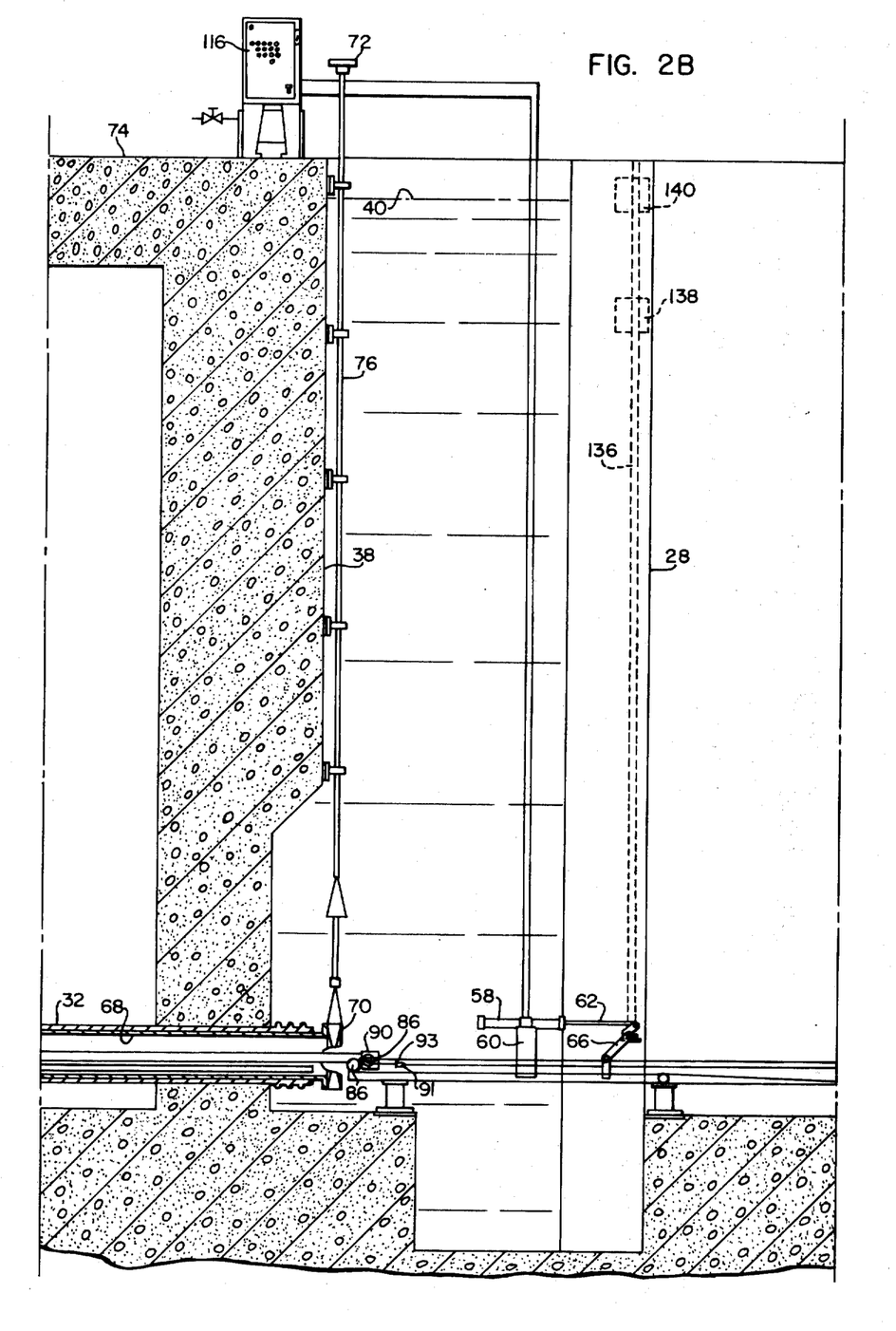
Figure 2C:
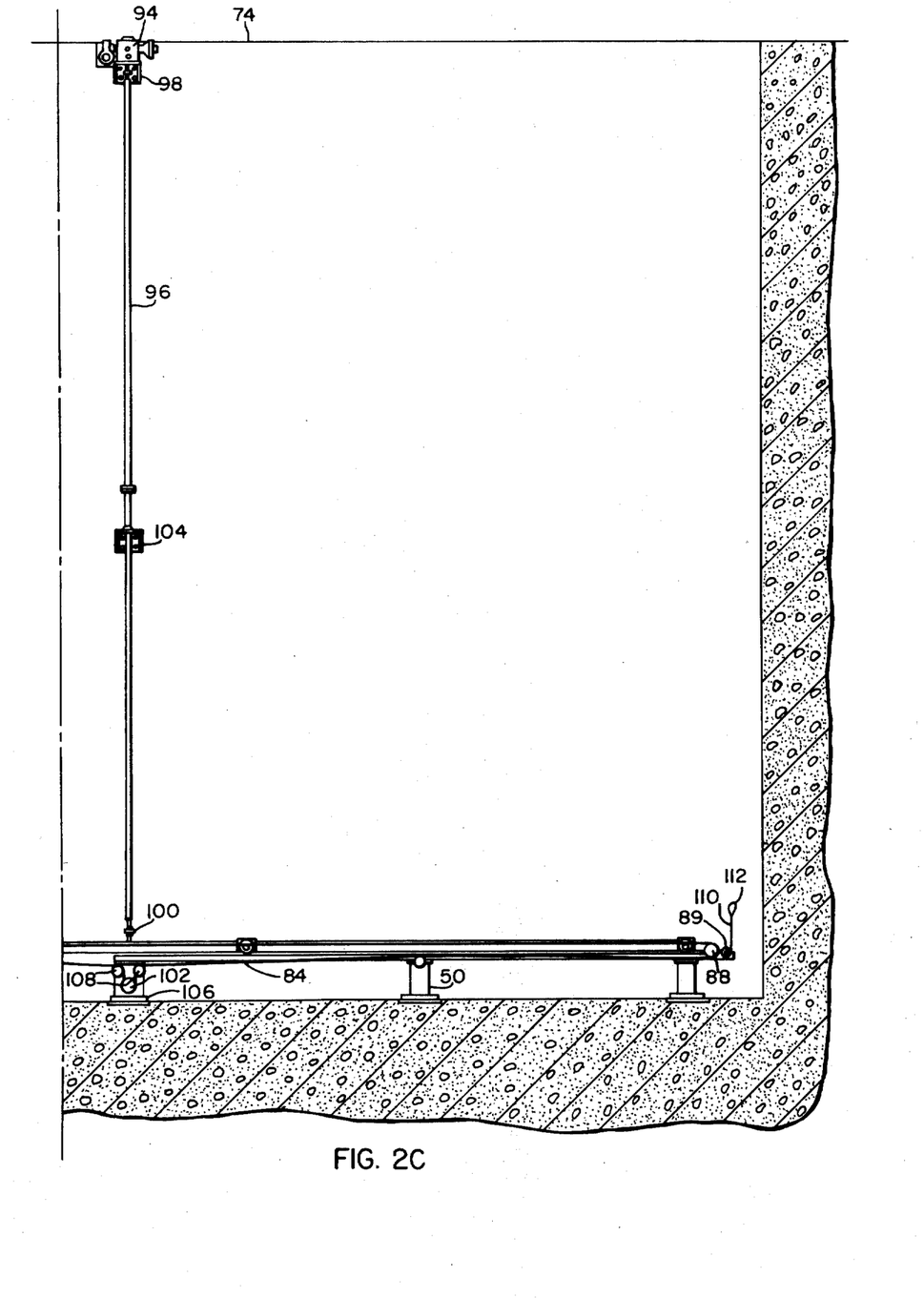
Figure 3A:
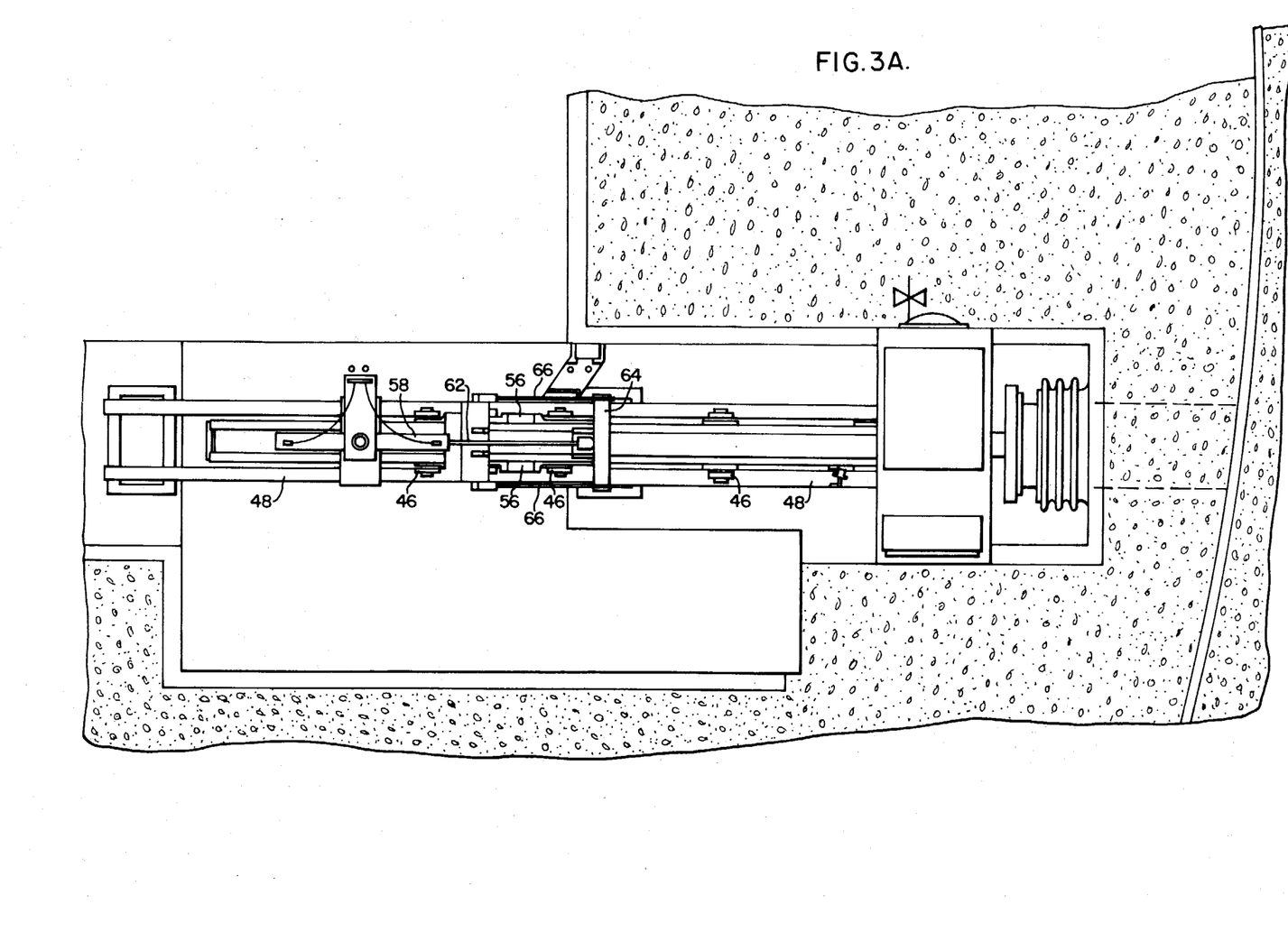
FIG. 3A is a plan view of the car shown in FIG. 2A.
Figure 3B:
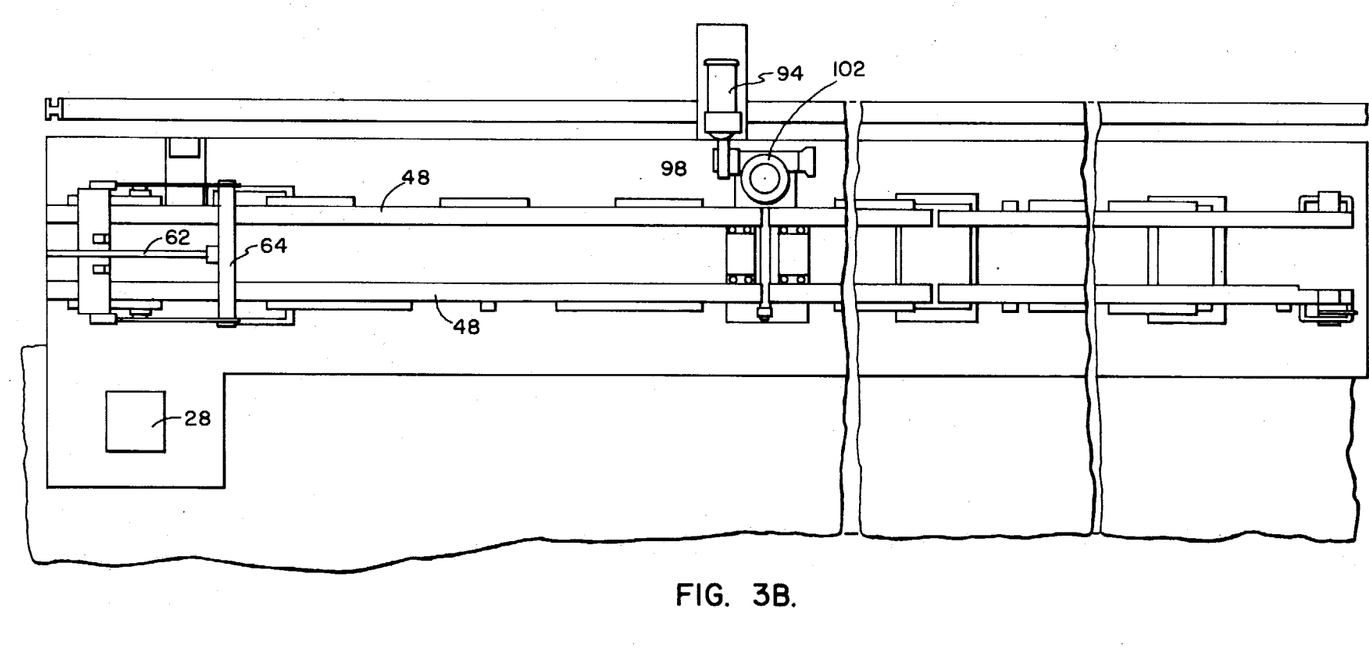
FIG. 3B is a plan view of FIG. 2B.

After reactor operation takes place for a predetermined period of time, the fuel in the fuel assemblies burns up thus requiring replacement of spent fuel with fresh fuel in the new fuel assemblies. To remove the spent fuel assemblies, the reactor missile shield, control rod mechanisms, reactor head and associated components not shown are removed from the reactor to expose the fuel assemblies, all in a well known manner. The containment area 10 housing the nuclear reactor is then flooded with borated water and a crane vertically lifts each assembly from the reactor and moves it into position for lowering onto the fuel transfer system shown in FIG. 2A through 5. In accordance with conventional practices, the fuel assemblies are transferred from the reactor to the spent fuel storage area 30 in a completely submerged condition, i.e., each fuel assembly is never exposed to the air and is always beneath the surface of water during the transfer operation. As shown in FIGS. 1 and 2, each fuel assembly is transferred through a flooded canal 31 and tube 32 which extends through the containment vessel wall 12. The assembly then is vertically lifted out of the transfer system by a crane and deposited in the spent fuel storage area 30. Although the size of the spent fuel storage area may vary, in one well known design, this storage area accommodates approximately 264 fuel assemblies. When it is desired to remove the spent fuel assemblies from the spent fuel storage area an overhead crane transfers each assembly to the cask loading pit 33. Depending on the design of cask, usually three or four fuel assemblies are loaded into each cask 34 and when the cask is sealed by a head, an overhead crane moves the cask to the railroad car 18 for subsequent removal to a disposal area.

Referring more specifically to the fuel transfer system disclosed in FIGS. 2A through 5 and which is located generally in the area designated 35 in FIG. 1, it will be seen that the fuel handling building 14 includes a concrete base 36 supporting a reinforced concrete wall 38 which comprises one wall of a tank (not shown) through which the fuel assemblies are moved. Wall 12 serves to separate the reactor containment area 10 from the fuel handling building 14. Each of these areas 10 and 14 are filled with water as indicated by the water levels 40.

It will be understood that the reactor containment 10 normally is not filled with water but is filled only during the fuel transfer process. Further, since spent fuel assemblies are radioactive it is necessary that they be transferred from the reactor containment 10 to the fuel handling building 14 while in a completely submerged condition and access between these two areas is therefore accomplished by means of tube 32 horizontally located in the walls 12 and 38.

The fuel transfer system thus used for effecting transfer of the fuel assemblies back and forth between these two areas, comprises a car 42 having a frame 44 supported on wheels 46 which ride on rails 48 supported by stanchions 50 and a base 51 extending along the complete length of the areas 10 and 14. FIG. 2A shows the fuel transfer car 42 in the reactor containment 10.

Referring now to the specific arrangement used for holding a fuel assembly on the car 42, a basket or container 52 is pivotally mounted on a pair of trunnions 54 disposed in openings 56 located on opposite sides of the car frame 44, the arrangement being such that the container freely moves between vertical and horizontal positions as shown by the arc inscribed in FIG. 2A. To achieve controlled rotary movement between these positions, a hydraulic cylinder 58 supported by base 60 contains a piston and connecting rods 62 coupled to brackets 64. A pair of arms 66 on opposite sides of the car extend from brackets 64 to a second set of trunnions 53 attached to the base 51 so that upon movement of the piston to the right as shown in FIG. 2A, forces transmitted through the linkages 62, 64 and 66 cause the container 52 to move from a vertical to horizontal position where it rests on the car surface. In the past, the cylinder was pivoted at its bottom end on the car and the possibility always existed that the assembly might fall and release radioactive gases into the containment from fractured fuel elements. To minimize the adverse effects which would flow from such an accident, an elaborate shock absorber system previously was installed adjacent the fuel assembly handling equipment. This disadvantage is eliminated in this invention by pivoting the container 52 at its center thus eliminating the need for the shock absorber system. Since the gravity forces on the opposite sides of the container are substantially balanced, a hydraulic system of minimum size can effectively swing the container between the horizontal and vertical positions. As an added precaution, the hydraulic cylinder 58 is equipped with an internal port which limits the flow of fluid from the piston side thus assuring that the container will rotate at only a predetermined speed and softly come to rest on the car surface.

As indicated above, the reactor containment is flooded only when a fuel assembly replacement operation is taking place. The structural arrangement for selectively flooding the reactor compartment includes a transfer conduit 68 permanently located inside tube 32. A valve 70 on the end of conduit 68 serves to seal it from water in the fuel building. The valve is operated between open and closed positions by a motor or handwheel 72 mounted on operating deck 74 and is connected to the valve 70 through a wall mounted valve stem 76 which actuates it between open and closed positions. The other end of transfer conduit 68 is designed to accept a blank flange 71 which seals the reactor side of the conduit. When the reactor compartment is dry and the reactor operating, blank flange 71 is sealed on the end of the conduit. At the time of reactor refueling or for other reasons, blank flange 71 is removed, valve 70 opened and water then flows from tank 14 through the conduit 68 to fill reactor compartment 10.

It will be apparent that since transfer conduit 68 must be susceptible to being sealed, the transfer mechanism used for moving car 42 through the transfer conduit must be removable from the conduit to permit unrestricted operation of the valve between open and closed positions. The transfer mechanism therefore is designed to have a long pusher arm 80 hinged by pin 82 at one end to the car while the other end is connected to roller chain 84 which effects lateral movement of car 42 through the tube. This mechanism design is such that the chain movement acts on the pusher arm to move car 42 between its initial position in FIG. 2B to the full line position shown at the left side of FIG. 2A.

Movement of car 42 on rails 48 through transfer conduit 68 is accomplished by a pair of endless roller chains 84 on opposite sides of the base which revolve around sprockets 86 and 88 attached to opposite sides of the base and on the opposite ends of the base 48. Both chains have a coupler 90 and both couplers are attached to an end 92 of the pusher arm so that as the chain laterally moves in either direction, the pusher arm and connected car 42 move in unison therewith thus effecting car movement between the reactor containment 10 and the fuel handling building 14. To achieve movement of the chains, a commercially available reversible motor 94 having a reducer brake and overload torque limiter therein is mounted on the operating floor 74 of the fuel handling building. A drive shaft 96 connected through flexible coupling 98 to motor 94, and through a similar flexible coupling 100 to the drive sprocket 102, serves to transmit power to the roller chains for moving the car 42 in the desired direction. A shaft support and guide 104 secured to a wall adjacent wall 38 imparts stability to the shaft during operation. The drive sprocket 102 is mounted in a miter box 106 which further supports a pair of idler pulleys 108 also mounted on the miter box structure. It will be apparent that when the motor 94 is energized, the drive shaft 96 is driven at a predetermined speed and this rotary force is transmitted to the drive sprocket which effects movement of the roller chains in either direction depending on whether the car 42 is to be moved from the fuel handling building 14 into the reactor containment 10 or vice versa.

Since the fuel transfer operation is conducted from the operating deck, it generally is not possible to determine when the drive motor should be deenergized to stop the car in a precise position for fuel assembly loading and unloading. The water in the tank may be murky which obscures visual observation of the car position. It also is not possible to determine whether the fuel assembly container 52 is in a vertical or horizontal position. In the past, limit switches have been used for this purpose and as described above, when the switches become defective, it is necessary to completely drain the tank to effect the necessary repairs and switch replacement.

Figure 4:
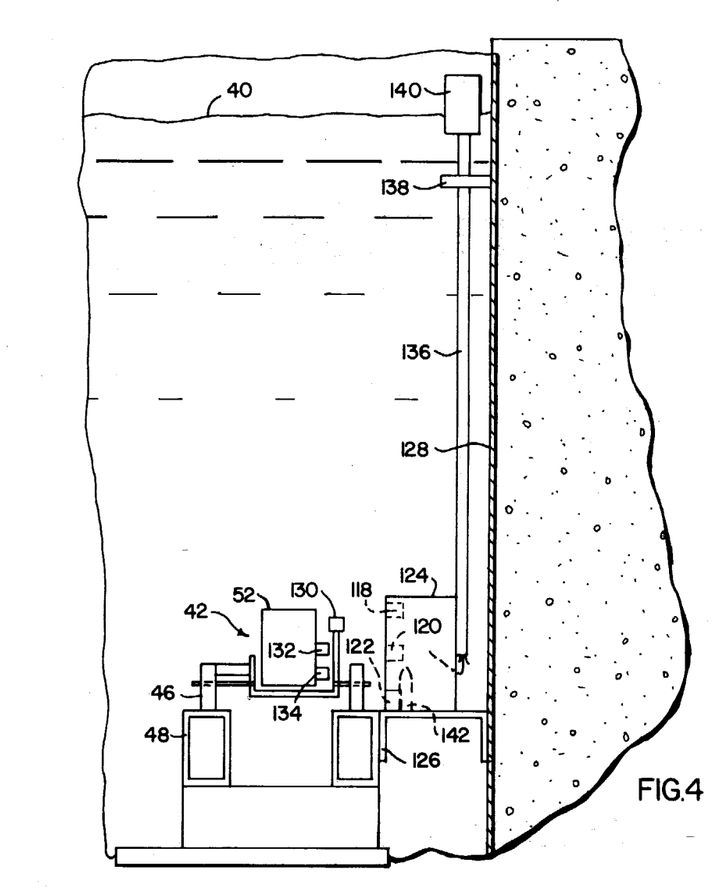
FIG. 4 is a view taken on lines 4—4 of FIG. 2A.
Figure 5:
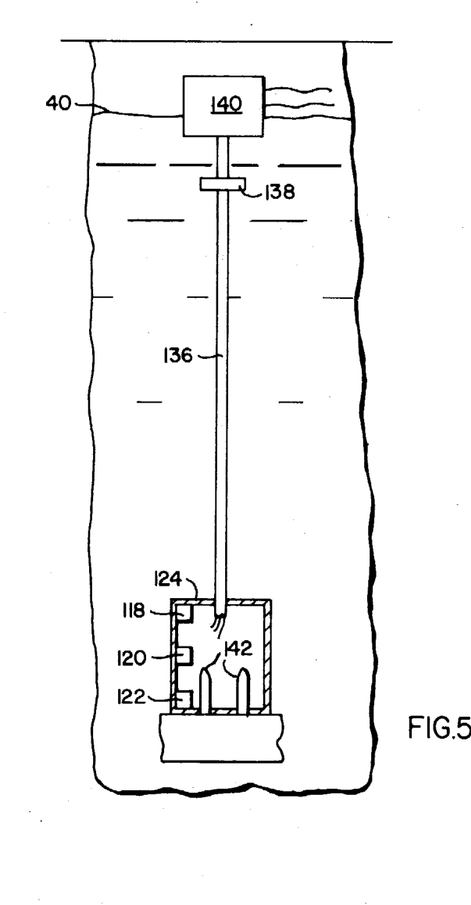
FIG. 5 is a side view of the car position indicating means shown in FIG. 4.

To overcome these problems, this invention includes structure for replacing such switches from the operating deck 74 thus eliminating the need to drain the tank. As illustrated in FIGS. 4 and 5, the car 42 is moved linearly by wheels 46 on track 48. To detect the position at which car 42 should be stopped when container 52 is vertically or horizontally oriented, proximity switches are used which close circuits to appropriate signal lights mounted on panel boards 114 and 116 and motor 94 on the operating deck. The switches 118, 120 and 122 are mounted on a bracket 124 removably supported on base 126 and located between track 48 and tank wall 128. A ferritic actuator 130 permanently attached to car 42 and ferritic actuators 132 and 134 mounted on container 52 are located to move into alignment with switches 118, 120 and 122. When the car moves to a desired point near its extreme ends of travel, ferritic actuator 130 passes close to switch 118 which closes a circuit to a light indicator on operating deck 74. Likewise, when the container is in a vertical or horizontal position, ferritic actuators 132 and 134 close switches 120 and 122 respectively to also visually indicate container position from the deck 74.

Since it is desirable to remove and replace these switches as a unit or without having to drain the tank, a long conduit 136 attached to wall 128 by brackets 138 contains conductors leading from junction box 140 to the switches mounted on bracket 124. The conduit and bracket 124 are rigidly attached to each other thereby permitting removal without having to break any electrical connections. In order to accurately locate the switches 118, 120 and 122 in position on the base 126, bracket 124 contains a pair of openings complementary in size to a pair of dowels 142 on bracket 126. When the bracket, conduit and switches are lowered into position near the base as a unit, the dowels fit into the bracket complementary openings thus assuring correct alignment of the switches and actuators.

Since it is necessary to have the same equipment and signalling devices in the fuel handling building to detect car and fuel assembly container positions, the dotted lines in FIG. 2B show the outline of these components which perform the same function.

In the event of electrical power failure during the time the car 42 is in reactor containment 10 or in the canal or tube 32, it may be necessary to remove the car by an emergency retraction mechanism. This mechanism includes an emergency pull out cable 110 which is wrapped around an end of sprocket 89 and is connected to a clevis 91 which in turn connects to a shear pin 94 mounted on the base 51 near valve 70. The end of pusher arm 80 is equipped with a clearance hole which permits the cable to easily pass therethrough but not the clevis. To remove car 42 from the reactor containment, cable 112 is pulled upwardly causing the shear pin to fail. The cable then passes through the clearance hole on pusher arm 80 until the clevis contacts and wedges itself securely in the pusher arm. Further upward movement of cable 112 will therefore pull the car 42 through conduit 61 into fuel building 14.

Although the control systems as such used for controlling operation and movement of car 42 do not comprise a part of this invention, it is obvious that appropriate and conventional electrical control and hydraulic power mechanisms are needed for effecting overall control of the system. As in usual constructions, these control systems are located in operating panels 114 and 116 located on the main operating floor 74.

OPERATION

In operation, when it is desired to remove fuel assemblies from a nuclear reactor located in reactor containment 10, blank flange 71 is removed and the missile shield, control mechanisms and reactor head are lifted from the reactor pressure vessel and the reactor containment 10 is flooded with borated water to a level indicated by the reference character 40. At this time, water is at the same level in a tank in the fuel handling building 14. After the reactor containment 10 is flooded, handwheel 72 is operated to open valve 70 mounted on an end of the transfer conduit 68 thus establishing communication between these two compartments. Motor 94 is energized with power being transmitted through the drive shaft 96 and the drive sprocket 102 to the roller chains 84. Car 42 is initially located in the fuel handling building 14 and the end of the pusher rod 80 opposite from car 42 is positioned adjacent sprocket 88. The chains are directly coupled to the pusher rod, and as the chains are moved linearly by motor 94, the pusher rod moves in unison with chain linear travel and the attached car therefore moves through transfer tube 68 into the position shown on the left side of FIG. 2A.

The hydraulic apparatus is then actuated to cause the piston in cylinder 58 to be pulled into the cylinder and thus change the position of fuel assembly container 52 from a horizontal to a vertical position. At this time, the mechanism is in a position to receive a fuel assembly which will have been removed from the nuclear reactor by an overhead crane in the usual manner. Upon depositing the fuel assembly in fuel container 52, power to the hydraulic mechanism is reversed and the piston moves outwardly and to the right as shown in FIG. 2A thereby causing the container to assume a horizontal position on car 42. The system is thus prepared to transfer car 42 and its fuel assembly from reactor compartment 10 to the fuel handling building. As motor 94 is energized, the roller chains rotate and pull the pusher rod 80 with its connected car 42 outwardly through the fuel transfer conduit into fuel handling building 14. As the pusher rod nears the end of its length of travel, an end of the rod engages the stop which halts pusher rod and car movement and thus exerts a torque on the car transmission train which is reflected in the power consumption of the motor. As this occurs, the overload torque limiter in the motor acts to open the power supply lines to the motor 94 and the system movement then comes to a halt.

To remove a fuel assembly from the container the hydraulic mechanism is again actuated to cause the piston and lifting arm to be moved to the left thus changing the position of the fuel container 52 from a horizontal to a vertical direction. At this stage in the fuel transfer system, an overhead crane then removes the fuel assembly, while still submerged in water, through canal 118 (FIG. 1) into the spent fuel storage area 30. As indicated above, spent fuel assemblies from the storage area 30 are moved while submerged through canal 118 and 120 to a cask loading pit 33 where a number of assemblies are loaded into a single cask which then is transferred by an overhead crane to the railroad car 18 for final disposition.

To supply new fuel assemblies to the reactor, an overhead crane moves each assembly from the new fuel storage area 24 to the fuel handling building 14 where it is placed in the fuel elevator. The elevator lowers the fresh fuel assembly to about the same level as car 42. The fuel assembly is then lifted out of the elevator and placed in fuel container 52 by means of an overhead crane. The hydraulic mechanism is then actuated to move the fuel container from a vertical to horizontal position, motor 94 is energized to impart force to the roller chains and the pusher mechanism 80 pushes car 42 through the transfer conduit 68 into the reactor containment 10. The position of the fuel container is then changed to a vertical position, and an overhead crane lifts the fuel assembly from its stored position in the fuel container and transfers it to the reactor. When this operation is complete the car 42 is returned to the fuel handling building 14, valve 70 closed, blank flange 71 replaced and the reactor containment 10 drained of water in order to permit subsequent operation of the reactor.

In view of the above it will be apparent that many modifications and variations are possible in light of the above teachings. It therefore is to be understood that within the scope of the appended claims, the invention may be practiced other than as specifically described.

We claim:

1. A system for transferring fuel assemblies between a fuel handling building and a nuclear reactor wherein the fuel handling building includes new and spent fuel pits and an operating deck on the top surface of walls forming said pits, a reactor containment area separated from said building by a containment wall, and a canal adapted to be filled with water extending from said pits to the reactor containment area to permit submerged movement of the fuel assemblies between the building and the nuclear reactor comprising:

said canal being arranged to extend through said wall and a valve mounted therein for selectively establishing communication between said building and containment area;

a base supporting rails which extend from the building through the canal into the containment area;

a car on said rails and means connected with the car for providing car linear movement between the fuel handling building and containment area;

a fuel assembly handling container rotatably mounted at its midpoint on said car;

first and second power actuating means respectively mounted on the base in the fuel handling building and the containment area, each of said actuating means including a reciprocable arm associated with the container for rotating it between vertical and horizontal positions;

thereby permitting loading and unloading of a fuel assembly therein and facilitating movement of the car through the canal;

car position indicating means for determining the position of said car in the fuel building and in said containment area, said position indicating means including car position indicators on said operating deck connected with switches mounted on said base and at locations where said car is to be stopped at its extreme ends of travel; and an actuator on said car which cooperates with said switches connected to said car position indicators to thereby show on the operating deck the position of said car; said car position indicating means further includes actuators on said container and switches on said base adapted by said actuators to show the vertical and horizontal orientation of said container.

2. The fuel transfer system according to claim 1, wherein the means connected with said car for imparting linear movement thereto comprises power driving means mounted on said operating deck; and a mechanical drive means interconnecting said driving means with said car for moving said car on said rails.

3. The fuel transfer system according to claim 2 wherein said switches in the car position indicating means comprise proximity switches adapted to be closed by the actuators respectively mounted on said car and container;

a conduit connected to a bracket supporting said proximity switches, said conduit serving as an avenue for conductors interconnecting said switches with light indicators on the operating deck; and said conduit, bracket and switches being removably mounted on said base and retractable therefrom as a single unit from the operating deck.

4. The fuel transfer system according to claim 1, wherein said means connected with the car for imparting linear movement thereto comprises an electric motor mounted on said operating deck;

a drive shaft interconnecting said motor with force transmitting means mounted on said base adjacent said rails;

a pair of roller chains on opposite sides of said rails and mounted for movement along said rails;

means extending longitudinally outward from said car and in alignment with said rails; and means connecting each of said chains to said means extending outwardly from said car so that upon energization of said motor, the force transmitting means causes said chains to move said car between the containment area and said fuel handling building.

5. The fuel handling system according to claim 4, wherein said motor includes an overload torque limiter; and stop means on each end of said rails engageable by said means extending longitudinally outward from said car so so that when said last-named means engages said stop means, the overload torque limiter shuts off the power supply to said motor.

* * * * *